US012092989B2

(12) United States Patent
Suga

(10) Patent No.: US 12,092,989 B2
(45) Date of Patent: Sep. 17, 2024

(54) UNIT ACCOMMODATION APPARATUS AND IMAGE FORMING APPARATUS

(71) Applicant: Tomoaki Suga, Kanagawa (JP)

(72) Inventor: Tomoaki Suga, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/232,354

(22) Filed: Aug. 10, 2023

(65) Prior Publication Data

US 2024/0077830 A1 Mar. 7, 2024

(30) Foreign Application Priority Data

Sep. 6, 2022 (JP) ................................ 2022-141202

(51) Int. Cl.
*G03G 21/16* (2006.01)
*G03G 15/00* (2006.01)
(Continued)

(52) U.S. Cl.
CPC ..... *G03G 21/1647* (2013.01); *G03G 15/0105* (2013.01); *G03G 15/0131* (2013.01);
(Continued)

(58) Field of Classification Search
CPC ........... G03G 15/0131; G03G 15/0105; G03G 15/1685; G03G 15/755; G03G 15/1665;
(Continued)

(56) References Cited

U.S. PATENT DOCUMENTS 11,106,175 B1 * 8/2021 Tanaka ............... G03G 21/1825
2006/0120748 A1 6/2006 Takehara et al.
(Continued)

FOREIGN PATENT DOCUMENTS

JP H11-352741 A 12/1999
JP 2001-154435 A 6/2001
(Continued)

OTHER PUBLICATIONS

Extended European Search Report issued Dec. 22, 2023 in European Patent Application No. 23193955.4, 9 pages.

*Primary Examiner* — Joseph S Wong
(74) *Attorney, Agent, or Firm* — XSENSUS LLP

(57) ABSTRACT

A unit accommodation apparatus includes a first unit and a second unit that are to be installed into and removed from an apparatus body through an opening in an installation-removal direction and are held by a unit holder. The unit holder includes a first positioner that is disposed opposite one lateral end of the first unit and the second unit and is detachably attached to the first unit and the second unit. A second positioner is disposed opposite another lateral end of the first unit and the second unit and holds the first unit and the second unit in a state in which the first unit and the second unit are detachably attached to the second positioner. The first positioner and the second positioner secure a relative position of the first unit relative to the second unit in a direction parallel to a hypothetical orthogonal plane perpendicular to the installation-removal direction.

14 Claims, 7 Drawing Sheets

(51) Int. Cl.

| | |
|---|---|
| ***G03G 15/01*** | (2006.01) |
| ***G03G 15/02*** | (2006.01) |
| ***G03G 15/16*** | (2006.01) |
| ***G03G 21/18*** | (2006.01) |

(52) U.S. Cl.
CPC ....... *G03G 15/1685* (2013.01); *G03G 15/755* (2013.01); *G03G 21/16* (2013.01); *G03G 21/1604* (2013.01); *G03G 21/1609* (2013.01); *G03G 21/1619* (2013.01); *G03G 21/1642* (2013.01); *G03G 21/1661* (2013.01); *G03G 21/168* (2013.01); *G03G 21/1821* (2013.01); *G03G 21/1835* (2013.01); *G03G 15/0216* (2013.01); *G03G 15/1665* (2013.01); *G03G 2215/00405* (2013.01); *G03G 2221/1651* (2013.01)

(58) Field of Classification Search
CPC ............... G03G 15/0216; G03G 21/16; G03G 21/1604; G03G 21/1609; G03G 21/1619; G03G 21/1642; G03G 21/1647; G03G 21/1661; G03G 21/168; G03G 21/1821; G03G 21/1835; G03G 2215/00405; G03G 2221/1651
See application file for complete search history.

(56) References Cited

U.S. PATENT DOCUMENTS

| | | | | |
|---|---|---|---|---|
| 2013/0272753 | A1 | 10/2013 | Fukasawa et al. | |
| 2013/0330100 | A1 | 12/2013 | Funayama et al. | |
| 2014/0241744 | A1 | 8/2014 | Ichikawa et al. | |
| 2015/0212454 | A1 | 7/2015 | Ichikawa et al. | |
| 2016/0313693 | A1 | 10/2016 | Fujiya et al. | |
| 2018/0046115 | A1 | 2/2018 | Fujita et al. | |
| 2020/0064765 | A1 | 2/2020 | Suga et al. | |
| 2020/0133172 | A1 | 4/2020 | Konishi et al. | |
| 2021/0200139 | A1* | 7/2021 | Hashimoto ........ | G03G 21/1619 |
| 2024/0053695 | A1* | 2/2024 | Takagi ............... | G03G 15/1615 |

FOREIGN PATENT DOCUMENTS

| | | | |
|---|---|---|---|
| JP | 2013-097208 | A | 5/2013 |
| JP | 2014-194515 | A | 10/2014 |
| JP | 2015-102836 | A | 6/2015 |
| JP | 2015-108729 | A | 6/2015 |
| JP | 2015-163933 | A | 9/2015 |
| JP | 2016-177181 | A | 10/2016 |

* cited by examiner

UNIT ACCOMMODATION APPARATUS AND IMAGE FORMING APPARATUS

CROSS-REFERENCE TO RELATED APPLICATION

This patent application is based on and claims priority pursuant to 35 U.S.C. § 119(a) to Japanese Patent Application No. 2022-141202, filed on Sep. 6, 2022, in the Japan Patent Office, the entire disclosure of which is hereby incorporated by reference herein.

BACKGROUND

Technical Field

Embodiments of this disclosure relate to a unit accommodation apparatus that accommodates a plurality of units and an image forming apparatus that forms an image.

Related Art

Related-art image forming apparatuses, such as copiers, facsimile machines, printers, and multifunction peripherals (MFP) having two or more of copying, printing, scanning, facsimile, plotter, and other functions, typically form an image on a recording medium according to image data.

Such image forming apparatuses include an image bearer and a transferor that contact each other to form a transfer nip therebetween. As a recording medium passes through the transfer nip, the transferor transfers an image formed on the image bearer onto the recording medium.

SUMMARY

This specification describes below an improved unit accommodation apparatus. In one embodiment, the unit accommodation apparatus includes an apparatus body having an opening. A first unit is to be installed into and removed from the apparatus body through the opening in an installation-removal direction. A second unit is to be installed into and removed from the apparatus body through the opening in the installation-removal direction. A unit holder holds the first unit and the second unit. The unit holder includes a first positioner that is disposed opposite one lateral end of the first unit and the second unit in the installation-removal direction. The one lateral end is disposed opposite the opening. The first positioner is detachably attached to the first unit and the second unit. A second positioner is disposed opposite another lateral end of the first unit and the second unit in the installation-removal direction. The second positioner holds the first unit and the second unit in a state in which the first unit and the second unit are detachably attached to the second positioner in the installation-removal direction. The first positioner and the second positioner secure a relative position of the first unit relative to the second unit in a direction parallel to a hypothetical orthogonal plane perpendicular to the installation-removal direction.

This specification further describes an improved image forming apparatus. In one embodiment, the image forming apparatus includes an apparatus body having an opening. An image bearer unit is to be installed into and removed from the apparatus body through the opening in a width direction of a recording medium. The width direction is perpendicular to a recording medium conveyance direction in which the recording medium is conveyed. A transfer unit is to be installed into and removed from the apparatus body through the opening in the width direction of the recording medium. The transfer unit contacts the image bearer unit to form a transfer nip between the image bearer unit and the transfer unit, through which the recording medium is conveyed. A unit holder holds the image bearer unit and the transfer unit. The unit holder includes a first positioner that is disposed opposite one lateral end of the image bearer unit and the transfer unit in the width direction of the recording medium. The one lateral end is disposed opposite the opening. The first positioner is detachably attached to the image bearer unit and the transfer unit. A second positioner is disposed opposite another lateral end of the image bearer unit and the transfer unit in the width direction of the recording medium. The second positioner holds the image bearer unit and the transfer unit in a state in which the image bearer unit and the transfer unit are detachably attached to the second positioner in the width direction of the recording medium. The first positioner and the second positioner secure a relative position of the image bearer unit relative to the transfer unit in a direction parallel to a hypothetical orthogonal plane perpendicular to the width direction of the recording medium.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
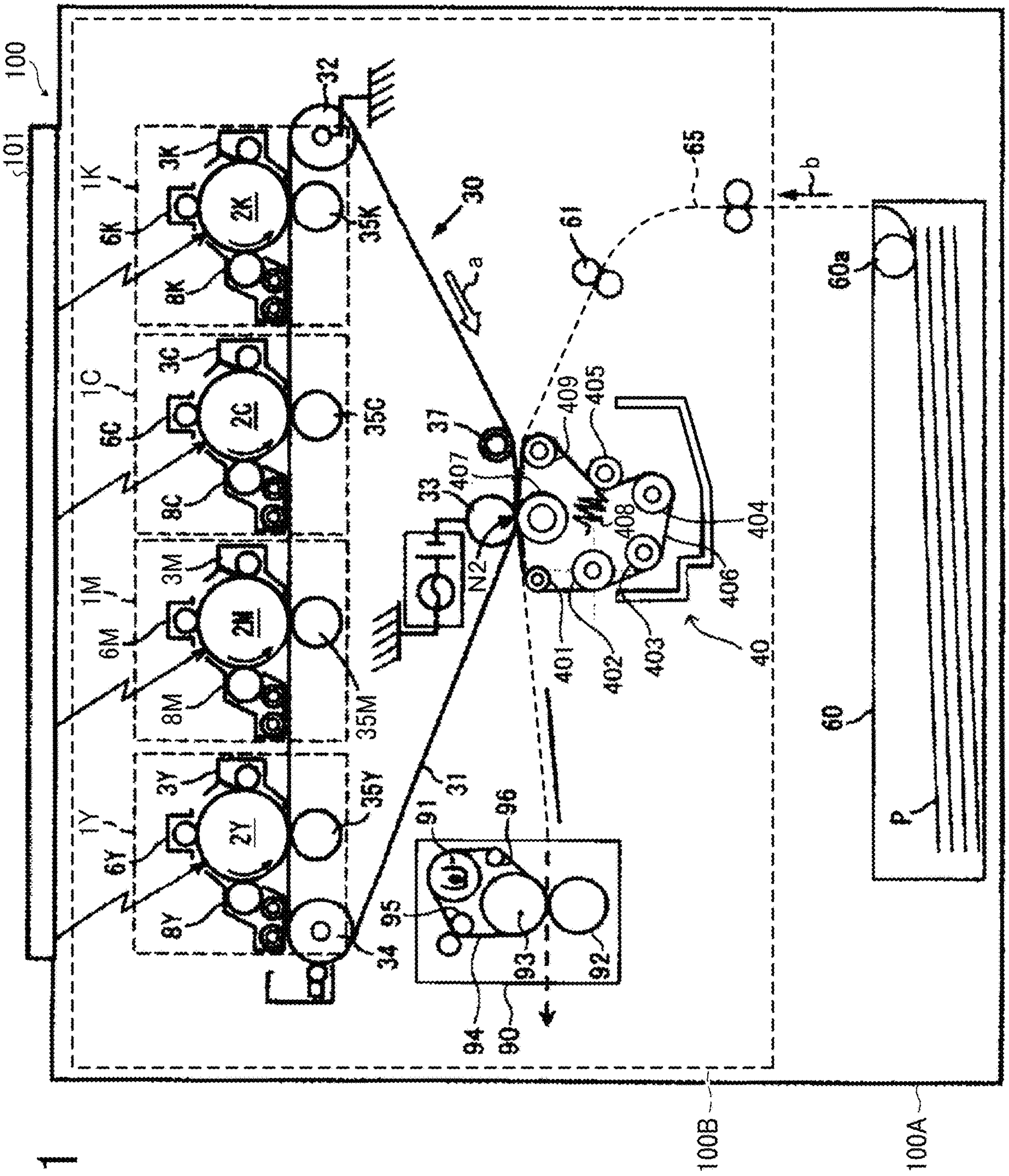
FIG. 1 is a schematic cross-sectional view of a printer according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Referring to drawings, a description is provided of embodiments of the present disclosure.

FIG. 1 is a schematic cross-sectional view of a printer 100 serving as an image forming apparatus or a unit accommodation apparatus according to an embodiment of the present disclosure, that is, a color printer that forms a color image by electrophotography. The printer 100 includes four image forming units 1Y, 1M, 1C, and 1K that form toner images in yellow (Y), magenta (M), cyan (C), and black (K), respectively. The printer 100 further includes an intermediate transfer unit 30 serving as an image bearer unit, a secondary transfer unit 40 serving as a transfer unit, a sheet tray 60 that loads a plurality of sheets P serving as recording materials or recording media, and a fixing device 90.

The four image forming units 1Y, 1M, 1C, and 1K serving as image forming devices use toners in different colors, that is, yellow, magenta, cyan, and black, as powder developers, respectively. Other than usage of the toners in the different colors, the image forming units 1Y, 1M, 1C, and 1K have a common construction. The image forming units 1Y, 1M, 1C, and 1K include drum-shaped photoconductors 2Y, 2M, 2C, and 2K serving as image bearers or electrostatic latent image bearers, drum cleaners 3Y, 3M, 3C, and 3K, dischargers, chargers 6Y, 6M, 6C, and 6K, and developing devices 8Y, 8M, 8C, and 8K, respectively.

The chargers 6Y, 6M, 6C, and 6K uniformly charge surfaces of the photoconductors 2Y, 2M, 2C, and 2K, respectively. The printer 100 further includes an optical writing unit 101 that is disposed above the image forming units 1Y, 1M, 1C, and 1K. The optical writing unit 101 emits exposure light such as laser beams that optically scan and expose the surfaces of the photoconductors 2Y, 2M, 2C, and 2K, forming electrostatic latent images thereon, respectively. The developing devices 8Y, 8M, 8C, and 8K containing yellow, magenta, cyan, and black toners develop the electrostatic latent images into yellow, magenta, cyan, and black toner images, respectively. The intermediate transfer unit 30 includes an intermediate transfer belt 31 serving as an endless belt. The intermediate transfer unit 30 primarily transfers the yellow, magenta, cyan, and black toner images formed on the photoconductors 2Y, 2M, 2C, and 2K, respectively, onto an outer circumferential surface (e.g., a surface of a surface layer) of the intermediate transfer belt 31. Thus, the intermediate transfer belt 31 bears the yellow, magenta, cyan, and black toner images.

The intermediate transfer unit 30 is disposed below the image forming units 1Y, 1M, 1C, and 1K. The intermediate transfer unit 30 includes the intermediate transfer belt 31 that is the endless belt stretched and rotated clockwise in FIG. 1. According to the embodiment, the outer circumferential surface of the intermediate transfer belt 31 rotates in a rotation direction a.

In addition to the intermediate transfer belt 31, the intermediate transfer unit 30 includes a driving roller 32, a secondary transfer backup roller 33 that contacts an inner circumferential surface of the intermediate transfer belt 31, a cleaning backup roller 34, four primary transfer rollers 35Y, 35M, 35C, and 35K, and a transfer upstream roller 37. The intermediate transfer belt 31 is looped over and stretched taut across the driving roller 32, the secondary transfer backup roller 33, the cleaning backup roller 34, the primary transfer rollers 35Y, 35M, 35C, and 35K, and the transfer upstream roller 37 that support the intermediate transfer belt 31. The printer 100 further includes a driver such as a driving motor that drives and rotates the driving roller 32. As the driving roller 32 rotates clockwise in FIG. 1, the driving roller 32 generates a torque that rotates the intermediate transfer belt 31 clockwise in FIG. 1.

The secondary transfer unit 40 is disposed outside and below a loop formed by the intermediate transfer belt 31. The secondary transfer unit 40 includes a secondary transfer belt 406 that is an endless belt serving as a transferor. The secondary transfer belt 406 is looped over a plurality of rollers, that is, a separating roller 401, driven rollers 402 and 403, a driving roller 404, a tension roller 405, an anti-skew roller 409, and a secondary transfer roller 407. The secondary transfer unit 40 may further include a cleaner and a lubrication device.

The sheet tray 60 is disposed below the secondary transfer unit 40. The sheet tray 60 is a storage that accommodates the plurality of sheets P layered into a sheaf of sheets P. The sheet tray 60 includes a roller 60*a* that contacts an uppermost sheet P of the sheaf of sheets P. The printer 100 further includes a conveyance path 65 and a registration roller pair 61. As the driver drives and rotates the roller 60*a* at a predetermined time, the roller 60*a* feeds the uppermost sheet P from the sheet tray 60 to the conveyance path 65 through which the uppermost sheet P is conveyed to a secondary transfer nip N2 formed between the intermediate transfer belt 31 and the secondary transfer belt 406. The registration roller pair 61 feeds the uppermost sheet P conveyed through the conveyance path 65 to the secondary transfer nip N2 at a time when the yellow, magenta, cyan, and black toner images superimposed on the outer circumferential surface of the intermediate transfer belt 31 reach the secondary transfer nip N2.

The secondary transfer roller 407 secondarily transfers the yellow, magenta, cyan, and black toner images superimposed on the outer circumferential surface of the intermediate transfer belt 31 collectively onto the sheet P at the secondary transfer nip N2 under pressure in a secondary transfer electric field. The yellow, magenta, cyan, and black toner images transferred on the sheet P form a full color toner image with a background color of white of the sheet P.

The fixing device 9) is disposed downstream from the secondary transfer nip N2 in a sheet conveyance direction b (e.g., a recording medium conveyance direction). As illustrated in FIG. 1, the fixing device 90 includes a fixing belt 94 and a plurality of support rollers that supports the fixing belt 94. The support rollers include a heating roller 91, a fixing roller 93, a support roller 96, and a tension roller 95. The fixing device 90 further includes a pressure roller 92 that presses against the fixing roller 93 via the fixing belt 94 to form a fixing nip between the pressure roller 92 and the fixing belt 94. As the sheet P bearing the full color toner image is conveyed through the fixing device 90, the pressure roller 92 and the fixing belt 94 that is contacted by the fixing roller 93 sandwich the sheet P at the fixing nip. As the sheet P receives pressure at the fixing nip and heat conducted from the heating roller 91 accommodating a heater to the fixing belt 94, the pressure roller 92 and the fixing belt 94 melt and fix toner of the full color toner image on the sheet P. The sheet P bearing the fixed full color toner image is ejected from the fixing device 90 onto an outside of the printer 100.

Figure 2:
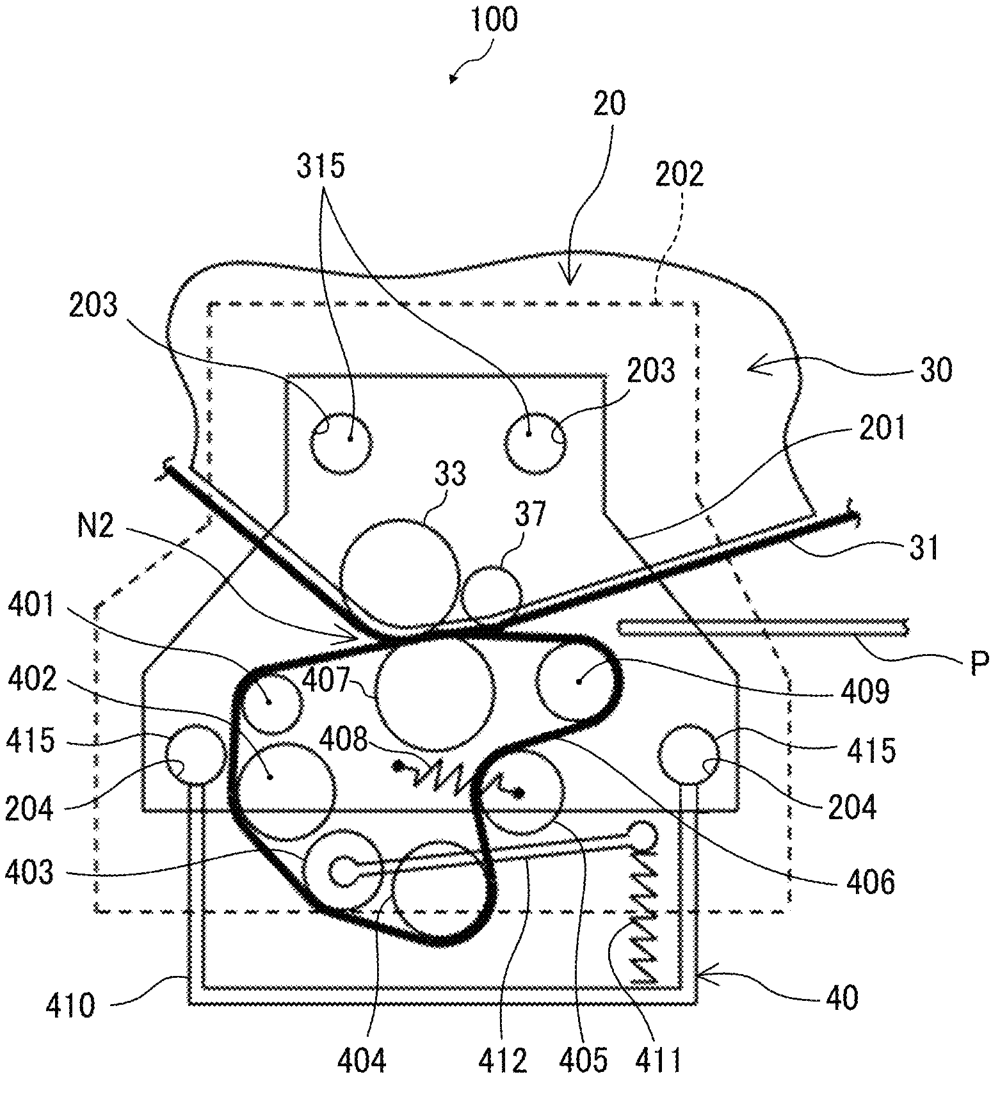
FIG. 2 is a diagram of the printer depicted in FIG. 1, illustrating a part of an intermediate transfer unit, a secondary transfer unit, and a unit holder incorporated in the printer, seen from a rear of the printer.

FIG. 2 is a diagram of the printer 100 serving as the image forming apparatus or the unit accommodation apparatus, illustrating a part of the intermediate transfer unit 30 and the secondary transfer unit 40 according to the embodiment, seen from a rear of the printer 100.

The secondary transfer unit 40 according to the embodiment employs a belt transfer method that secondarily transfers the toner image onto the sheet P at the secondary transfer nip N2 formed between the intermediate transfer belt 31 and the secondary transfer belt 406 that contacts the intermediate transfer belt 31. The belt transfer method achieves advantages below compared to a roller transfer method in which the secondary transfer roller 407 contacts the intermediate transfer belt 31 directly to form the secondary transfer nip N2 therebetween. For example, the advantages include an advantage of improving flexibility in layout, an advantage of improving separation of a thin sheet P from the intermediate transfer belt 31 and the secondary transfer belt 406, and an advantage of improving a life of the secondary transfer unit 40.

The secondary transfer unit 40 includes six tension rollers that contact an inner circumferential surface of the secondary transfer belt 406, supporting the secondary transfer belt 406. For example, the six tension rollers include the secondary transfer roller 407, the separating roller 401, the two driven rollers 402 and 403, the driving roller 404, and the anti-skew roller 409.

The secondary transfer unit 40 further includes the tension roller 405 that contacts and presses against an outer circumferential surface of the secondary transfer belt 406. The secondary transfer unit 40 further includes a spring 408 that biases the tension roller 405 against the secondary transfer belt 406, applying tension to the secondary transfer belt 406. As the tension roller 405 applies tension to the secondary transfer belt 406, the secondary transfer belt 406 retains contact with the tension rollers disposed within a loop formed by the secondary transfer belt 406. In order to prevent slippage over the secondary transfer belt 406 and prevent damaging the outer circumferential surface of the secondary transfer belt 406, the tension roller 405 has a roller surface that is made of soft sponge or the like.

The tension roller 405 is disposed opposite a stretched portion of the secondary transfer belt 406, that is interposed between and stretched by the driving roller 404 and the anti-skew roller 409. The tension roller 405 presses the stretched portion of the secondary transfer belt 406 toward an interior within the loop formed by the secondary transfer belt 406 with a biasing force generated by the spring 408. As the tension roller 405 presses the secondary transfer belt 406, the stretched portion of the secondary transfer belt 406, that is interposed between and stretched by the driving roller 404 and the anti-skew roller 409, is stretched taut across the driving roller 404 and the anti-skew roller 409 such that the stretched portion is recessed toward the interior within the loop formed by the secondary transfer belt 406. Accordingly, the secondary transfer belt 406 is wound around each of the driving roller 404 and the anti-skew roller 409 at a winding angle not smaller than 90 degrees.

The driving roller 404 receives power (e.g., a driving force) generated by a power supply disposed outside the secondary transfer unit 40 and transmitted through a driving force transmitter such as a gear and a coupling. The driving roller 404 drives and rotates the secondary transfer belt 406 in a predetermined rotation direction at a predetermined speed. In order to drive and rotate the secondary transfer belt 406 at a target speed, the driving roller 404 is requested to retain contact with the secondary transfer belt 406 without slippage over the secondary transfer belt 406. Hence, in order to achieve sufficient friction with respect to the secondary transfer belt 406, the driving roller 404 has a surface that is made of hard rubber or the like. As the driving roller 404 drives and rotates the secondary transfer belt 406, the secondary transfer belt 406 drives and rotates the tension rollers that are other than the driving roller 404 and disposed within the loop formed by the secondary transfer belt 406.

The secondary transfer roller 407 presses the secondary transfer belt 406 against a wound portion of the intermediate transfer belt 31, that is wound around the secondary transfer backup roller 33 and is a part of an entire span of the intermediate transfer belt 31 in a circumferential direction thereof, thus forming the secondary transfer nip N2 between the secondary transfer belt 406 and the intermediate transfer belt 31. The separating roller 401 has a curvature that separates the sheet P from the secondary transfer belt 406. The secondary transfer roller 407 includes a metal shaft that serves as a core metal and a sponge layer that is mounted on a surface of the metal shaft and made of sponge.

The secondary transfer unit 40 according to the embodiment includes a pressure base 410 that presses a unit body of the secondary transfer unit 40 against the intermediate transfer unit 30. The pressure base 410 is anchored with a pressure spring 411 serving as a biasing member. The pressure spring 411 generates a biasing force that biases a spring follower 412 mounted on the unit body of the secondary transfer unit 40, thus pressing the unit body against the intermediate transfer unit 30. Accordingly, the secondary transfer roller 407 supported by the unit body is pressed against the secondary transfer backup roller 33. Consequently, the secondary transfer roller 407 contacts and presses the secondary transfer belt 406 against the intermediate transfer belt 31, forming the secondary transfer nip N2 therebetween.

As illustrated in FIGS. 1 and 2, the printer 100 further includes an apparatus body 100A and a unit holder 20 that holds the intermediate transfer unit 30 and the secondary transfer unit 40.

A description is provided of a construction of the unit holder 20.

Figure 3:
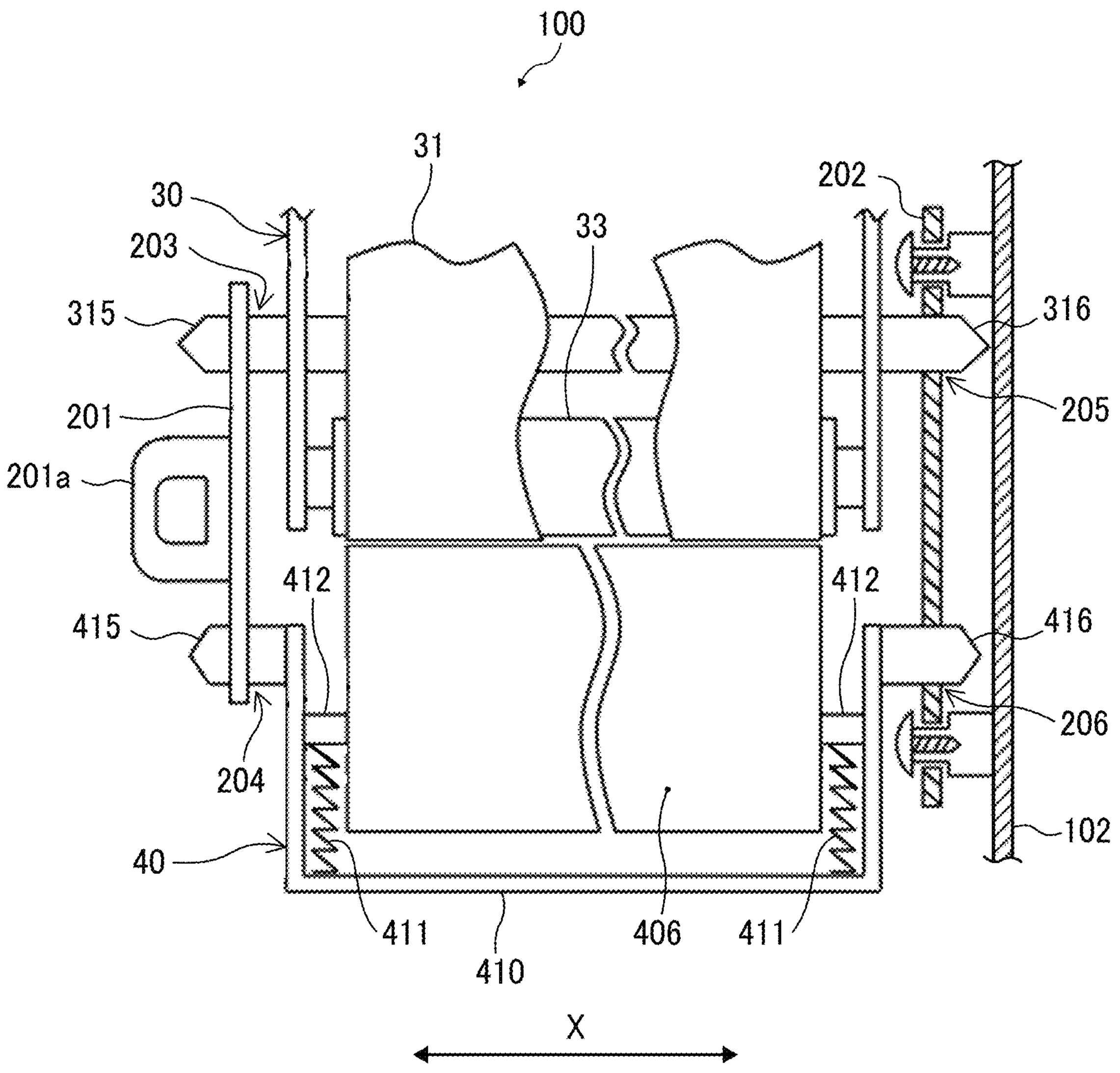
FIG. 3 is a diagram of the printer depicted in FIG. 2, illustrating the unit holder, seen from a side of the printer.

FIG. 3 is a diagram of the printer 100 serving as the image forming apparatus or the unit accommodation apparatus, illustrating the unit holder 20 according to the embodiment, seen from a side of the printer 100.

According to the embodiment, the intermediate transfer unit 30 serving as the image bearer unit and the secondary transfer unit 40 serving as the transfer unit are detachably attached to and supported by the unit holder 20 supported by the apparatus body 100A of the printer 100.

As illustrated in FIG. 1, the printer 100 further includes an opening 100B at a front of the apparatus body 100A of the printer 100. The intermediate transfer unit 30 and the secondary transfer unit 40 held by the unit holder 20 are removed from and installed into the apparatus body 100A of the printer 100 through the opening 100B. The printer 100 further includes a cover (e.g., a door) that covers the opening 100B. When an operator (e.g., a user or a service engineer) removes the intermediate transfer unit 30 and the secondary transfer unit 40 from the apparatus body 100A or installs the intermediate transfer unit 30 and the secondary transfer unit 40 into the apparatus body 100A, the operator opens the cover to expose the opening 100B. Thus, the operator performs detachment and attachment of the intermediate transfer unit 30 and the secondary transfer unit 40 with respect to the unit holder disposed inside the apparatus body 100A through the opening 100B.

As illustrated in FIGS. 2 and 3, the unit holder 20 includes a front plate 201 and a back plate 202. The front plate 201 is disposed opposite the front of the apparatus body 100A of the printer 100, that is provided with the opening 10B through which the intermediate transfer unit 30 and the secondary transfer unit 40 are attached to and detached from the unit holder 20. The back plate 202 is disposed opposite the rear of the apparatus body 100A of the printer 100, that is opposite to the front of the apparatus body 100A. The front plate 201 and the back plate 202 serve as positioners that position the intermediate transfer unit 30 and the secondary transfer unit 40 relatively to each other, securing a relative position of the intermediate transfer unit 30 relative to the secondary transfer unit 40.

The front plate 201 serving as the positioner disposed in proximity to the opening 100B is provided with positioning holes 203 and 204. The intermediate transfer unit 30 and the secondary transfer unit 40 include positioning pins 315 and 415, respectively. The positioning holes 203 and 204 serving as engaging portions engage and fit the positioning pins 315 and 415 serving as engaged portions, respectively. The back plate 202 serving as the positioner that is opposite to the front plate 201 is provided with positioning holes 205 and 206. The intermediate transfer unit 30 and the secondary transfer unit 40 include positioning pins 316 and 416, respectively. The positioning holes 205 and 206 serving as engaging portions engage and fit the positioning pins 316 and 416 serving as engaged portions, respectively.

The positioning pins 315 and 316 of the intermediate transfer unit 30 are constructed of both lateral ends of a single pin that penetrates through a front frame and a rear frame of the intermediate transfer unit 30, respectively. The positioning pins 415 and 416 of the secondary transfer unit 40 are mounted on a front frame and a rear frame of the pressure base 410, respectively, that presses the unit body of the secondary transfer unit 40 against the intermediate transfer unit 30.

The positioning pin 315 of the intermediate transfer unit 30 and the positioning pin 415 of the secondary transfer unit 40 engage or fit the positioning holes 203 and 204 that penetrate through the front plate 201, respectively. The positioning pin 316 of the intermediate transfer unit 30 and the positioning pin 416 of the secondary transfer unit 40 engage or fit the positioning holes 205 and 206 that penetrate through the back plate 202, respectively. Thus, the unit holder 20 holds the intermediate transfer unit 30 and the secondary transfer unit 40 in a state in which the intermediate transfer unit 30 is positioned relative to the secondary transfer unit 40 in a direction parallel to a hypothetical orthogonal plane (e.g., a paper surface in FIG. 3) that is perpendicular to a width direction X of the sheet P (e.g., a front-back direction of the printer 100).

As illustrated in FIG. 3, the apparatus body 100A of the printer 100 includes a rear plate 102 that supports the back plate 202 of the unit holder 20. For example, in order to place the intermediate transfer unit 30 held by the unit holder 20 properly with respect to the apparatus body 100A, in a state in which the intermediate transfer unit 30 is positioned relative to the rear plate 102, the rear plate 102 supports the back plate 202 of the unit holder 20. The rear plate 102 also positions and holds the photoconductors 2Y, 2M, 2C, and 2K. Hence, the rear plate 102 secures or restricts a relative position of the intermediate transfer belt 31 of the intermediate transfer unit 30 relative to the photoconductors 2Y, 2M, 2C, and 2K. On the other hand, the rear plate 102 supports the back plate 202 of the unit holder 20 that holds the intermediate transfer unit 30 such that the back plate 202 is displaced or moved along the hypothetical orthogonal plane perpendicular to the width direction X of the sheet P. Thus, a position of the back plate 202 of the unit holder 20 is adjusted relative to the rear plate 102 so that the intermediate transfer unit 30 held by the unit holder 20 is positioned properly with respect to the rear plate 102.

The back plate 202 of the unit holder 20 is provided with a hole that penetrates through the back plate 202. The rear plate 102 mounts a stud that engages the hole. The stud has a shaft having a diameter that is smaller than a diameter of the hole penetrating through the back plate 202. The stud has a length that is greater than a plate thickness of the back plate 202. Hence, w % ben a screw is attached to the stud, a mating surface of the screw causes the unit holder 20 to be supported by the rear plate 102 and prevents the unit holder 20 from falling off the rear plate 102. However, the back plate 202 of the unit holder 20 is displaced or moved with respect to the rear plate 102 along the hypothetical orthogonal plane perpendicular to the width direction X of the sheet P.

If the back plate 202 of the unit holder 20 is combined with the rear plate 102 or secured to the rear plate 102, the position of the back plate 202 is not adjusted with respect to the rear plate 102 in the direction parallel to the hypothetical orthogonal plane perpendicular to the width direction X of the sheet P. In this case, the photoconductors 2Y, 2M, 2C, and 2K and the secondary transfer belt 406 that contact the intermediate transfer unit 30 are positionally secured and restricted relative to the intermediate transfer unit 30 by separate positioners, respectively. In this case, accumulated dimensional errors and the like may impose an excessive securing force or an excessive restricting force, that positionally secures and restricts the photoconductors 2Y, 2M, 2C, and 2K and the secondary transfer belt 406, on the intermediate transfer unit 30. Accordingly, the intermediate transfer unit 30 may suffer from a disadvantage of deformation and the operator may suffer from a disadvantage of exerting an excessively great force to perform detachment or attachment of the intermediate transfer unit 30 with respect to the unit holder 20.

According to the embodiment, as described above, a relative position of the back plate 202 of the unit holder 20 relative to the rear plate 102 is adjusted in the direction parallel to the hypothetical orthogonal plane perpendicular to the width direction X of the sheet P, thus preventing the excessive securing force and the excessive restricting force from being imposed on the intermediate transfer unit 30 and suppressing the disadvantages described above.

Conversely, as illustrated in FIG. 3, in a state in which the front plate 201 of the unit holder 20 is not supported by the apparatus body 100A of the printer 100, the front plate 201 is attached to the positioning pin 315 of the intermediate transfer unit 30 and the positioning pin 415 of the secondary transfer unit 40. Accordingly, while the front plate 201 of the unit holder 20 does not position the intermediate transfer unit 30 and the secondary transfer unit 40 with respect to the apparatus body 100A of the printer 100, the front plate 201 secures the relative position of the intermediate transfer unit 30 relative to the secondary transfer unit 40.

According to the embodiment, in order to increase pressure with which the secondary transfer unit 40 presses against the intermediate transfer unit 30 at the secondary transfer nip N2, the front plate 201 and the back plate 202 that secure the relative position of the intermediate transfer unit 30 relative to the secondary transfer unit 40 receive increased pressure from the positioning pins 315 and 415 and the positioning pins 316 and 416, respectively. Hence, the positioning holes 203 and 204 that receive pressure from the positioning pins 315 and 415, respectively, penetrate through the front plate 201, that is, an identical flat plate. Accordingly, the front plate 201 includes a plate portion that is interposed between the positioning pins 315 and 415 and is not provided with a step and a bend. Thus, the front plate 201 is immune from bending stress. Consequently, the front plate 201 receives pressure from the positioning pins 315 and 415 mainly with tensile stress of the front plate 201. Hence, even if increased pressure is applied at the secondary transfer nip N2, the front plate 201 is immune from deformation.

Similarly, the positioning holes 205 and 206 that receive pressure from the positioning pins 316 and 416, respectively, penetrate through the back plate 202, that is, an identical flat plate. Accordingly, the back plate 202 includes a plate portion that is interposed between the positioning pins 316 and 416 and is not provided with a step and a bend. Thus, the back plate 202 is immune from bending stress. Consequently, the back plate 202 receives pressure from the positioning pins 316 and 416 mainly with tensile stress of the back plate 202. Hence, even if increased pressure is applied at the secondary transfer nip N2, the back plate 202 is immune from deformation.

Figure 4:
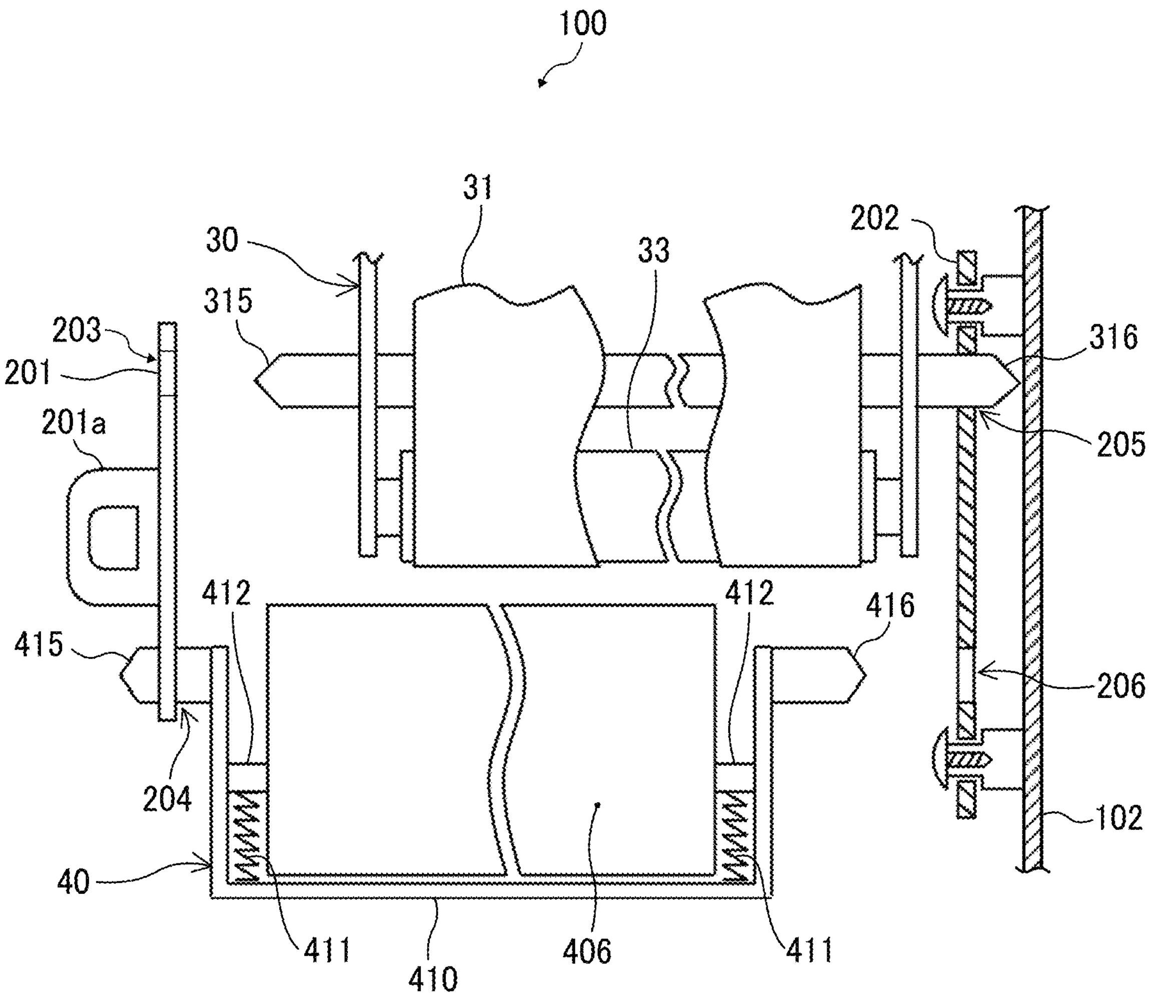
FIG. 4 is a diagram of the printer depicted in FIG. 3, illustrating the intermediate transfer unit from which a front plate of the unit holder is detached while the front plate is attached to the secondary transfer unit.
Figure 5:
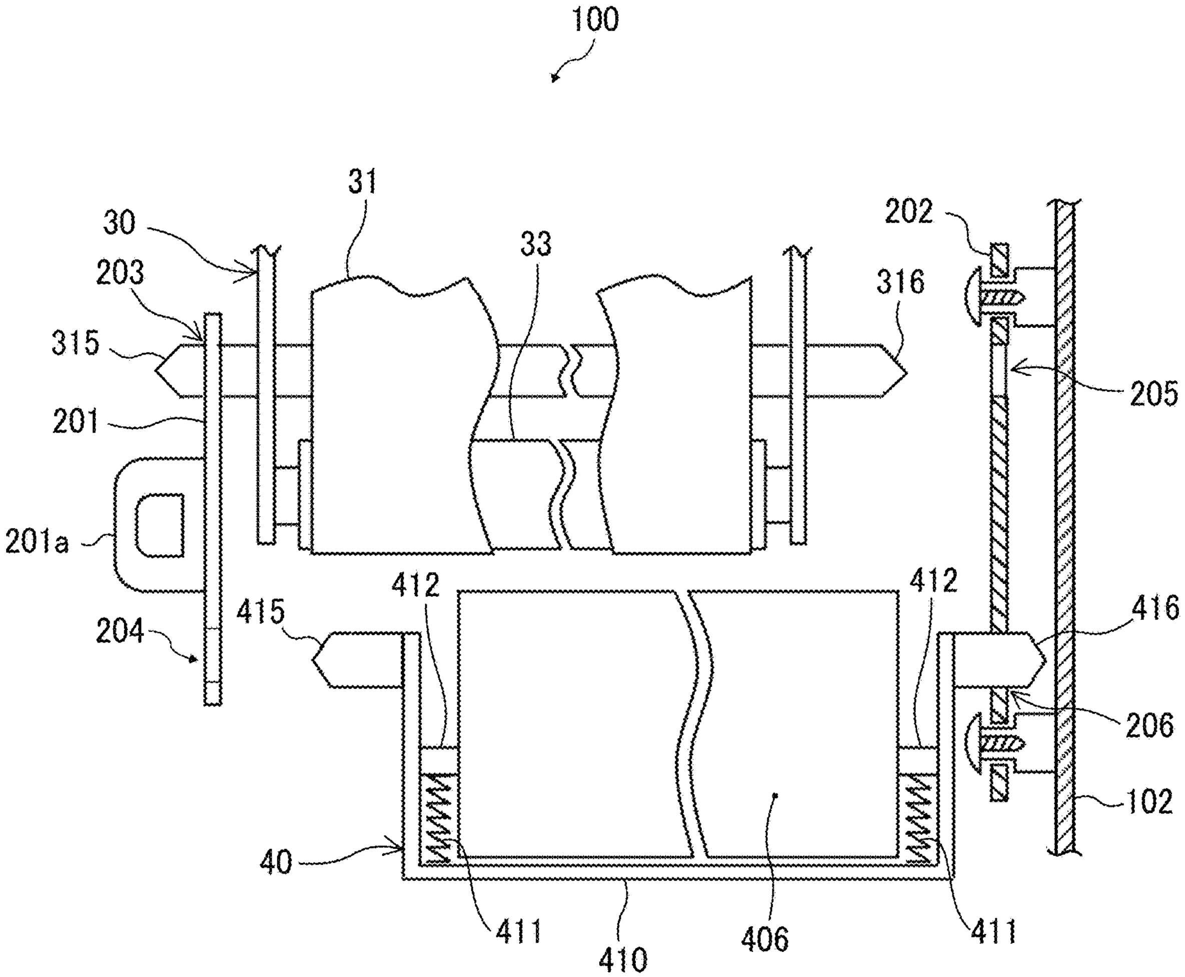
FIG. 5 is a diagram of the printer depicted in FIG. 3, illustrating the secondary transfer unit from which the front plate of the unit holder is detached while the front plate is attached to the intermediate transfer unit.

The front plate 201 of the unit holder 20 is detachably attached to the positioning pin 315 of the intermediate transfer unit 30 and the positioning pin 415 of the secondary transfer unit 40 separately. Hence, as illustrated in FIG. 4, in a state in which the positioning hole 204 engages the positioning pin 415 of the secondary transfer unit 40, the positioning hole 203 penetrating through the front plate 201 of the unit holder 20 is detached from the positioning pin 315 of the intermediate transfer unit 30. Similarly, as illustrated in FIG. 5, in a state in which the positioning hole 203 engages the positioning pin 315 of the intermediate transfer unit 30, the positioning hole 204 penetrating through the front plate 201 of the unit holder 20 is detached from the positioning pin 415 of the secondary transfer unit 40.

A description is provided of a construction of a first comparative image forming apparatus.

The first comparative image forming apparatus includes an intermediate transfer unit and a secondary transfer unit that are not removed from and installed into an apparatus body of the first comparative image forming apparatus separately. With the construction of the first comparative image forming apparatus, when the operator removes one of the intermediate transfer unit and the secondary transfer unit from the apparatus body and performs maintenance or the like (e.g., removal of a jammed sheet, replacement of parts, and inspection), the operator removes both the intermediate transfer unit and the secondary transfer unit from the apparatus body. Hence, the operator also removes another one of the intermediate transfer unit and the secondary transfer unit, on which the operator does not perform maintenance or the like, from the apparatus body unnecessarily, generating useless work. Additionally, after the operator removes both the intermediate transfer unit and the secondary transfer unit from the apparatus body temporarily, the operator separates one of the intermediate transfer unit and the secondary transfer unit, on which the operator performs maintenance or the like, from another one of the intermediate transfer unit and the secondary transfer unit. Thus, the operator performs double processes. Hence, the operator may suffer from inefficiency in maintenance of the intermediate transfer unit and the secondary transfer unit.

A description is provided of a construction of a second comparative image forming apparatus.

The second comparative image forming apparatus includes an intermediate transfer belt serving as an image bearer and a secondary transfer unit including a nip formation roller serving as a transferor. The nip formation roller presses against the intermediate transfer belt to form a secondary transfer nip therebetween. The nip formation roller includes a rotation shaft having both lateral ends that are rotatably supported. A pressure base holds the secondary transfer unit. As a spring biases the pressure base, the nip formation roller disposed inside the secondary transfer unit held by the pressure base contacts the intermediate transfer belt. The pressure base that holds the secondary transfer unit is installed in a transfer unit that supports the intermediate transfer belt.

Both the intermediate transfer belt serving as the image bearer and the nip formation roller serving as the transferor are disposed inside a single unit that is installed into and removed from an apparatus body of the second comparative image forming apparatus. Hence, when the operator performs maintenance or the like, the operator may not remove one of the intermediate transfer belt and the nip formation roller from the apparatus body easily.

To address the circumstances of the first comparative image forming apparatus and the second comparative image forming apparatus, according to the embodiment, for example, as illustrated in FIG. 4, if the operator removes the secondary transfer unit 40 from the apparatus body 100A of the printer 100, after the operator detaches the front plate 201 from the intermediate transfer unit 30 that is not removed from the apparatus body 100A, the operator holds a grip 201*a* mounted on the front plate 201 and pulls and removes the secondary transfer unit 40 attached with the front plate 201 from the apparatus body 100A of the printer 100 through the opening 100B.

For example, as illustrated in FIG. 5, if the operator removes the intermediate transfer unit 30 from the apparatus body 100A of the printer 100, after the operator detaches the front plate 201 from the secondary transfer unit 40 that is not removed from the apparatus body 100A, the operator holds the grip 201*a* mounted on the front plate 201 and pulls and removes the intermediate transfer unit 30 attached with the front plate 201 from the apparatus body 100A of the printer 100 through the opening 100B.

According to the embodiment, the operator does not remove one of the intermediate transfer unit 30 and the secondary transfer unit 40, for which removal is unnecessary, from the apparatus body 100A of the printer 100. The operator removes another one of the intermediate transfer unit 30 and the secondary transfer unit 40, for which removal is necessary, from the apparatus body 100A of the printer 100 with a simple operation of detaching the front plate 201 from the one of the intermediate transfer unit 30 and the secondary transfer unit 40. Thus, the printer 100 facilitates removal of the intermediate transfer unit 30 or the secondary transfer unit 40 from the apparatus body 100A of the printer 100 for maintenance or the like.

Figure 6:
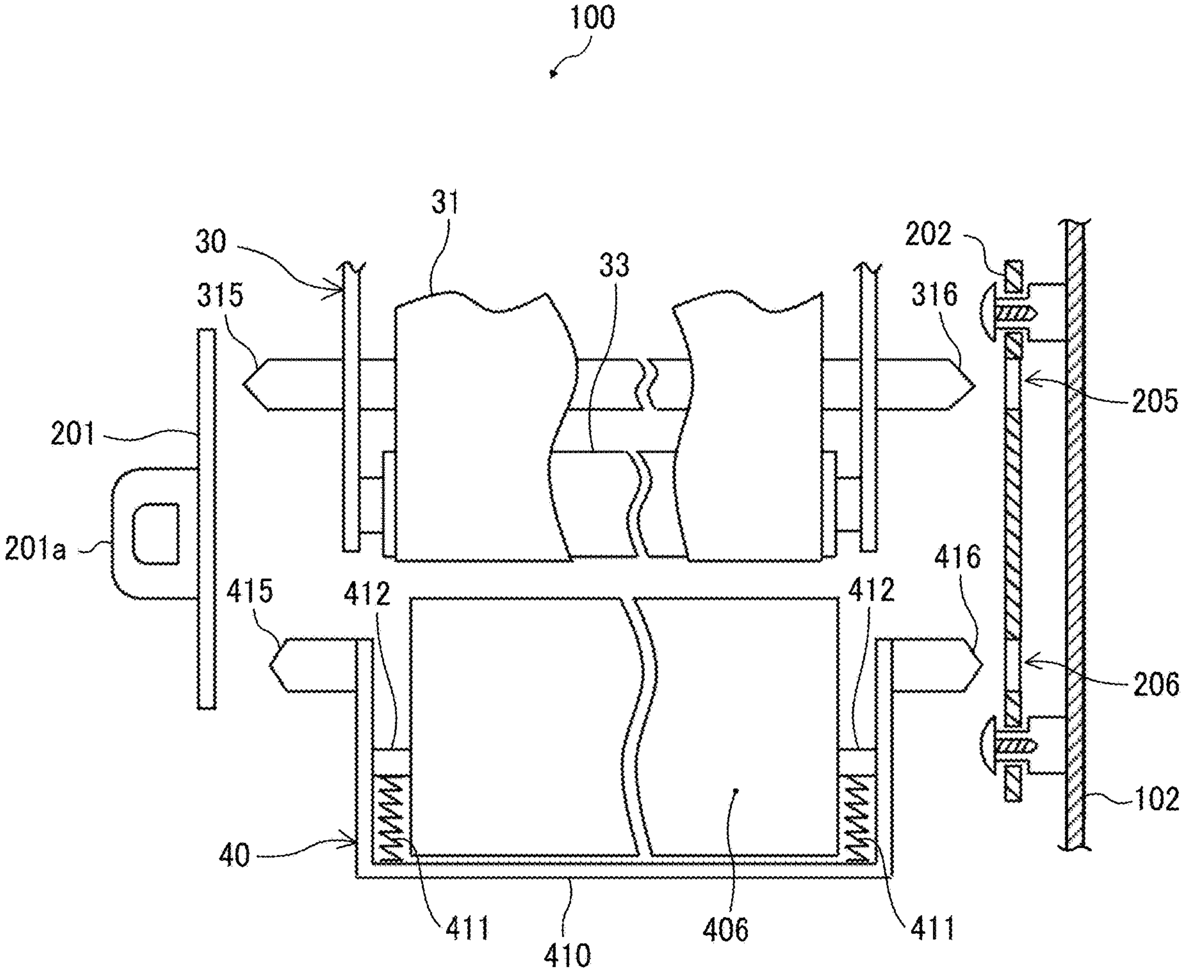
FIG. 6 is a diagram of the printer depicted in FIG. 3, illustrating the intermediate transfer unit and the secondary transfer unit from which the front plate of the unit holder is detached.

According to the embodiment, as illustrated in FIG. 6, for example, if the operator removes both the intermediate transfer unit 30 and the secondary transfer unit 40 from the apparatus body 100A of the printer 100, after the operator detaches the front plate 201 from both the intermediate transfer unit 30 and the secondary transfer unit 40, the operator pulls and removes the intermediate transfer unit 30 and the secondary transfer unit 40 separately from the apparatus body 100A of the printer 100 through the opening 100B. According to the embodiment, even if the operator removes any one of the intermediate transfer unit 30 and the secondary transfer unit 40 before another one of the intermediate transfer unit 30 and the secondary transfer unit 40, the another one of the intermediate transfer unit 30 and the secondary transfer unit 40, that is removed later, does not inhibit removal of the one of the intermediate transfer unit 30 and the secondary transfer unit 40, that is removed earlier. Accordingly, the operator removes the intermediate transfer unit 30 and the secondary transfer unit 40 in arbitrary order with improved efficiency in removal of the intermediate transfer unit and the secondary transfer unit 40.

With the unit holder 20 according to the embodiment, even in a state in which the front plate 201 is detached, the back plate 202 holds the intermediate transfer unit 30 and the secondary transfer unit 40. Accordingly, even if the operator detaches the front plate 201 from both the intermediate transfer unit 30 and the secondary transfer unit 40, the intermediate transfer unit 30 and the secondary transfer unit 40 do not fall off the apparatus body 100A of the printer 100. When the operator attaches the intermediate transfer unit 30 and the secondary transfer unit 40 to the front plate 201 next time, the front plate 201 serves as a face plate that couples the intermediate transfer unit 30 with the secondary transfer unit in an original state.

Figure 7:
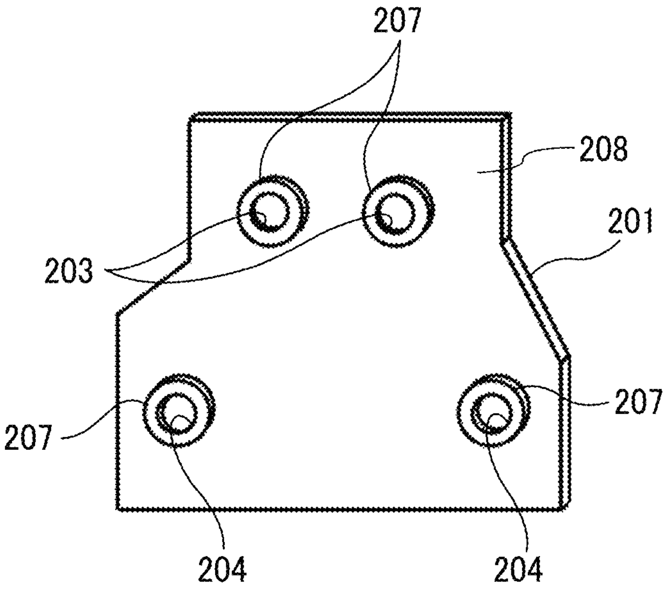
FIG. 7 is a perspective view of the front plate depicted in FIG. 4 as one example.

FIG. 7 is a perspective view of the front plate 201 according to an embodiment of the present disclosure, illustrating one example of a construction of the front plate 201.

The front plate 201 according to the embodiment includes a flat plate portion 208. The flat plate portion 208 is provided with the positioning holes 203 that engage the positioning pins 315 of the intermediate transfer unit 30, respectively, and the positioning holes 204 that engage the positioning pins 415 of the secondary transfer unit 40, respectively. At least the flat plate portion 208 is made of a steel sheet that is not bent and has enhanced mechanical strength. Each of the positioning holes 203 and 204 is attached with a resin bearing 207 that is made of resin as a low friction material having a coefficient of friction that is smaller than a coefficient of friction of the steel sheet. Accordingly, when the operator attaches and detaches the front plate 201 to and from the intermediate transfer unit 30 and the secondary transfer unit 40, the positioning pins 315 and 415 slide over the resin bearings 207, respectively, with decreased friction. Consequently, even if the operator repeats attachment and detachment of the front plate 201 to and from the intermediate transfer unit 30 and the secondary transfer unit 40, the resin bearings 207 suppress rattling and galling that degrade efficiency in operation by the operator.

The embodiments described above are examples and achieve advantages peculiar to aspects below, respectively.

A description is provided of a first aspect of the technology of the present disclosure.

As illustrated in FIGS. 1, 2, and 3, an image forming apparatus or a unit accommodation apparatus (e.g., the printer 100) according to the first aspect includes an image bearer (e.g., the intermediate transfer belt 31) and a transferor (e.g., the secondary transfer belt 406) that contacts the image bearer to form a transfer nip (e.g., the secondary transfer nip N2) therebetween. As a recording medium (e.g., the sheet P) is conveyed through the transfer nip, an image formed on the image bearer is transferred onto the recording medium. The image forming apparatus further includes an image bearer unit or a first unit (e.g., the intermediate transfer unit 30) that includes the image bearer and a transfer unit or a second unit (e.g., the secondary transfer unit 40) that includes the transferor. The image forming apparatus further includes an apparatus body (e.g., the apparatus body 100A) having an opening (e.g., the opening 100B) and a unit holder (e.g., the unit holder 20). The unit holder holds the image bearer unit and the transfer unit that are to be installed into and removed from the apparatus body through the opening in an installation-removal direction, that is, a width direction (e.g., the width direction X) of the recording medium. The width direction of the recording medium is perpendicular to a recording medium conveyance direction (e.g., the sheet conveyance direction b) in which the recording medium is conveyed.

The unit holder includes a first positioner (e.g., the front plate 201) and a second positioner (e.g., the back plate 202). The first positioner is disposed opposite one lateral end of the image bearer unit and the transfer unit in the width direction of the recording medium. The one lateral end is disposed opposite and disposed in proximity to the opening. The second positioner is disposed opposite another lateral end of the image bearer unit and the transfer unit in the width direction of the recording medium. The another lateral end is opposite to the one lateral end in the width direction of the recording medium. The first positioner and the second positioner secure a relative position of the image bearer unit relative to the transfer unit in a direction parallel to a hypothetical orthogonal plane perpendicular to the width direction of the recording medium. The first positioner is detachably attached to the image bearer unit and the transfer unit. The second positioner holds the image bearer unit and the transfer unit in a state in which the image bearer unit and the transfer unit are detachably attached to the second positioner in the width direction of the recording medium.

A description is provided of a construction of a third comparative image forming apparatuses.

The third comparative image forming apparatus includes a single removal unit that is installed into and removed from an apparatus body of the third comparative image forming apparatus. The removal unit accommodates both an image bearer and a transferor. In order to remove one of the image bearer and the transferor from the apparatus body and perform maintenance or the like, the operator removes both the image bearer and the transferor from the apparatus body. Hence, the operator also removes another one of the image bearer and the transferor, on which the operator does not perform maintenance or the like, from the apparatus body unnecessarily, generating useless work. Additionally, after the operator removes the removal unit from the apparatus body, the operator removes one of the image bearer and the transferor, on which the operator performs maintenance or the like, from the removal unit. Thus, the operator performs double processes. Hence, the operator may suffer from inefficiency in maintenance of the image bearer and the transferor.

According to the first aspect, the unit holder disposed inside the apparatus body of the image forming apparatus supports the image bearer unit incorporating the image bearer and the transfer unit incorporating the transferor. The transfer unit is separated from the image bearer unit. The image bearer unit and the transfer unit are installed into and removed from the apparatus body through the opening in the width direction (e.g., a main scanning direction) of the recording medium. For example, the first positioner is disposed opposite one lateral end of the image bearer unit and the transfer unit in the width direction of the recording medium and disposed opposite the opening. The second positioner is disposed opposite another lateral end of the image bearer unit and the transfer unit, that is opposite to the one lateral end in the width direction of the recording medium. The first positioner and the second positioner secure the relative position of the image bearer unit relative to the transfer unit. The first positioner and the second positioner hold both lateral ends (e.g., one lateral end disposed opposite the opening and another lateral end opposite to the one lateral end) of the image bearer unit and the transfer unit, respectively, in the width direction of the recording medium. The first positioner disposed opposite the opening is detachably attached to the image bearer unit and the transfer unit. The second positioner being opposite to the first positioner holds the image bearer unit and the transfer unit such that the image bearer unit and the transfer unit are detachably attached to the second positioner in the width direction of the recording medium.

Accordingly, if the operator removes one of the image bearer unit and the transfer unit from the apparatus body of the image forming apparatus, for example, after the operator removes the first positioner disposed opposite the opening from both the image bearer unit and the transfer unit, the operator pulls and removes the one of the image bearer unit and the transfer unit from the apparatus body of the image forming apparatus through the opening. Alternatively, for example, after the operator detaches the first positioner disposed opposite the opening from another one of the image bearer unit and the transfer unit, that is not removed from the apparatus body of the image forming apparatus, the operator pulls and removes the one of the image bearer unit and the transfer unit from the apparatus body of the image forming apparatus through the opening in a state in which the first positioner disposed opposite the opening is attached to the one of the image bearer unit and the transfer unit.

Hence, according to the first aspect, the operator does not remove one of the image bearer and the transferor, for which removal is unnecessary, from the apparatus body of the image forming apparatus. Additionally, the operator removes another one of the image bearer and the transferor, for which removal is necessary, from the apparatus body of the image forming apparatus with a simple operation of detaching the first positioner disposed opposite the opening from the intermediate transfer unit or the transfer unit that incorporates the one of the image bearer and the transferor. Thus, the image forming apparatus facilitates removal of the another one of the image bearer and the transferor from the apparatus body of the image forming apparatus for maintenance or the like.

A description is provided of a second aspect of the technology of the present disclosure.

According to the second aspect based on the first aspect, as illustrated in FIGS. 4 and 5, in a state in which the unit holder holds one of the transfer unit and the image bearer unit, another one of the transfer unit and the image bearer unit is removed from the apparatus body. For example, as illustrated in FIGS. 4 and 5, in a state in which the second positioner holds one of the transfer unit and the image bearer unit, the first positioner holding another one of the transfer unit and the image bearer unit is removed from the apparatus body of the image forming apparatus.

Accordingly, the unit holder facilitates removal of the another one of the transfer unit and the image bearer unit.

A description is provided of a third aspect of the technology of the present disclosure.

According to the third aspect based on the second aspect, as illustrated in FIGS. 4 and 5, the second positioner holds the one of the transfer unit and the image bearer unit.

Accordingly, the unit holder has a simple construction.

A description is provided of a fourth aspect of the technology of the present disclosure.

According to the fourth aspect based on any one of the first aspect to the third aspect, as illustrated in FIGS. 1 and 3, the image forming apparatus further includes a contact member (e.g., the photoconductors 2Y, 2M, 2C, and 2K) and a third positioner (e.g., the rear plate 102). The contact member contacts the image bearer. The third positioner is mounted on the apparatus body of the image forming apparatus and disposed opposite the another lateral end of the image bearer unit and the transfer unit in the width direction of the recording medium. The third positioner secures a relative position of the image bearer (e.g., the intermediate transfer belt 31) relative to the contact member in the direction parallel to the hypothetical orthogonal plane perpendicular to the width direction of the recording medium. The third positioner supports the second positioner in a state in which the second positioner is displaced along the hypothetical orthogonal plane perpendicular to the width direction of the recording medium.

According to the fourth aspect, the third positioner is mounted on the apparatus body of the image forming apparatus and disposed opposite the another lateral end of the image bearer unit and the transfer unit in the width direction of the recording medium. The third positioner secures or restricts the relative position of the image bearer relative to the contact member that contacts the image bearer. On the other hand, the second positioner is disposed opposite the another lateral end of the image bearer unit and the transfer unit in the width direction of the recording medium. The second positioner secures or restricts the relative position of the image bearer unit including the image bearer relative to the transfer unit. The second positioner may be combined with the third positioner or may be secured to the third positioner. Thus, the second positioner may not be adjusted positionally with respect to the third positioner in the direction parallel to the hypothetical orthogonal plane perpendicular to the width direction of the recording medium. Hence, accumulated dimensional errors and the like may impose an excessive securing force or an excessive restricting force on the image bearer unit. In this case, the image bearer unit may suffer from a disadvantage of deformation or the operator may suffer from a disadvantage of exerting an excessively great force to perform removal or installation of the image bearer unit.

According to the fourth aspect, the third positioner supports the second positioner such that the second positioner is displaced along the hypothetical orthogonal plane perpendicular to the width direction of the recording medium, thus preventing the excessive securing force and the excessive restricting force from being imposed on the image bearer unit and suppressing the disadvantages described above.

If the second positioner also secures the relative position of the image bearer unit relative to the contact member, the second positioner prevents the excessive securing force and the excessive restricting force from being imposed on the image bearer unit and suppresses the disadvantages described above. However, in this case, the second positioner is subject to deformation by a load, degrading accuracy in the relative position of the image bearer unit relative to the contact member and causing a failure of variation in pressure applied at the transfer nip formed between the image bearer and the transferor disadvantageously, for example.

According to the fourth aspect, the second positioner and the third positioner do not cause the failure described above, preventing the excessive securing force and the excessive restricting force from being imposed on the image bearer unit and suppressing the disadvantages described above.

A description is provided of a fifth aspect of the technology of the present disclosure.

According to the fifth aspect based on any one of the first aspect to the fourth aspect, as illustrated in FIGS. 3 and 7, the image bearer unit further includes a first engaged portion (e.g., the positioning pin 315) and a second engaged portion (e.g., the positioning pin 316). The transfer unit includes a third engaged portion (e.g., the positioning pin 415) and a fourth engaged portion (e.g., the positioning pin 416). The unit holder further includes a first engaging portion (e.g., the positioning hole 203) and a second engaging portion (e.g., the positioning hole 204) that penetrate through the first positioner and engage the first engaged portion and the third engaged portion, respectively. The unit holder further includes a third engaging portion (e.g., the positioning hole 205) and a fourth engaging portion (e.g., the positioning hole 206) that penetrate through the second positioner and engage the second engaged portion and the fourth engaged portion, respectively.

At least one of the first positioner and the second positioner includes a bearing (e.g., the resin bearing 207) and a positioner body (e.g., the flat plate portion 208). The bearing is attached to at least one of the first engaging portion, the second engaging portion, the third engaging portion, and the fourth engaging portion, that penetrates through at least one of the first positioner and the second positioner. The bearing is made of a low friction material having a coefficient of friction that is smaller than a coefficient of friction of the positioner body.

Accordingly, when the operator removes and installs the image bearer unit and the transfer unit with respect to the apparatus body, the engaged portion (e.g., the positioning pin 315 serving as the first engaged portion, the positioning pin 316 serving as the second engaged portion, the positioning pin 415 serving as the third engaged portion, and the positioning pin 416 serving as the fourth engaged portion) slides over the bearing with decreased friction. Consequently, even if the operator repeats attachment and detachment of the image bearer unit and the transfer unit with respect to the first positioner and the second positioner, the bearing suppresses rattling and galling that degrade efficiency in operation and the like by the operator.

A description is provided of a sixth aspect of the technology of the present disclosure.

According to the sixth aspect based on any one of the first aspect to the fifth aspect, as illustrated in FIG. 7, the engaging portion (e.g., the positioning hole 203 serving as the first engaging portion, the positioning hole 204 serving as the second engaging portion, the positioning hole 205 serving as the third engaging portion, and the positioning hole 206 serving as the fourth engaging portion) penetrates through at least one of the first positioner and the second positioner and engages the engaged portion (e.g., the positioning pin 315 serving as the first engaged portion, the positioning pin 316 serving as the second engaged portion, the positioning pin 415 serving as the third engaged portion, and the positioning pin 416 serving as the fourth engaged portion) of each of the image bearer unit and the transfer unit. The engaging portion (e.g., the positioning hole 203 serving as the first engaging portion and the positioning hole 205 serving as the third engaging portion) that engages the engaged portion (e.g., the positioning pin 315 serving as the first engaged portion and the positioning pin 316 serving as the second engaged portion) of the image bearer unit and the engaging portion (e.g., the positioning hole 204 serving as the second engaging portion and the positioning hole 206 serving as the fourth engaging portion) that engages the engaged portion (e.g., the positioning pin 415 serving as the third engaged portion and the positioning pin 416 serving as the fourth engaged portion) of the transfer unit penetrate through at least one of the first positioner and the second positioner, that defines an identical flat plate.

Accordingly, when the transferor of the transfer unit contacts the image bearer of the image bearer unit, the first positioner and the second positioner of the unit holder are immune from bending stress and receive tensile stress mainly. Hence, the first positioner and the second positioner are immune from deformation caused by contact of the transferor with the image bearer. Consequently, the transferor contacts the image bearer with increased pressure.

A description is provided of a seventh aspect of the technology of the present disclosure.

Figure 8:
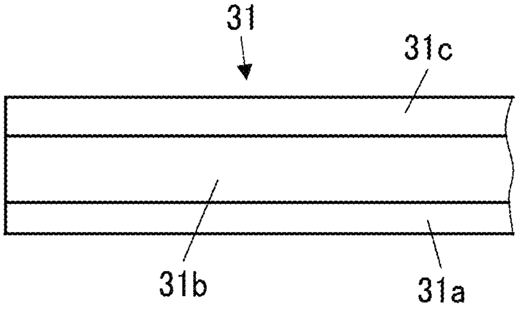
FIG. 8 is a cross-sectional view of an intermediate transfer belt incorporated in the intermediate transfer unit depicted in FIG. 2.

According to the seventh aspect based on any one of the first aspect to the sixth aspect, as illustrated in FIG. 1, the image bearer includes an intermediate transferor (e.g., the intermediate transfer belt 31) onto which an image formed on the contact member or a latent image bearer (e.g., the photoconductors 2Y, 2M, 2C, and 2K) is transferred primarily or intermediately. As illustrated in FIG. 8, the intermediate transferor (e.g., the intermediate transfer belt 31) is an endless belt that includes a surface layer (e.g., a surface layer 31*a*), an elastic layer (e.g., an elastic layer 31*b*), and an inelastic layer (e.g., an inelastic layer 31*c*). The surface layer bears the image. The elastic layer is disposed on the surface layer. The inelastic layer is disposed on the elastic layer.

Accordingly, the elastic layer of the intermediate transferor is deformed at the transfer nip, facilitating uniform transfer of the image (e.g., the toner image) onto the recording medium having surface asperities.

According to the embodiments described above, the printer 100 serves as the image forming apparatus. Alternatively, the image forming apparatus may be a copier, a facsimile machine, a multifunction peripheral (MFP) having at least two of copying, printing, scanning, facsimile, and plotter functions, or the like.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A unit accommodation apparatus comprising:

an apparatus body having an opening;

a first unit to be installed into and removed from the apparatus body through the opening in an installation-removal direction;

a second unit to be installed into and removed from the apparatus body through the opening in the installation-removal direction; and a unit holder to hold the first unit and the second unit, the unit holder including:

a first positioner disposed opposite one lateral end of the first unit and the second unit in the installation-removal direction, the one lateral end disposed opposite the opening, the first positioner detachably attached to the first unit and the second unit; and a second positioner disposed opposite another lateral end of the first unit and the second unit in the installation-removal direction, the second positioner to hold the first unit and the second unit in a state in which the first unit and the second unit are detachably attached to the second positioner in the installation-removal direction, the first positioner and the second positioner to secure a relative position of the first unit relative to the second unit in a direction parallel to a hypothetical orthogonal plane perpendicular to the installation-removal direction.

2. An image forming apparatus comprising:

an apparatus body having an opening;

an image bearer unit to be installed into and removed from the apparatus body through the opening in a width direction of a recording medium, the width direction perpendicular to a recording medium conveyance direction in which the recording medium is conveyed;

a transfer unit to be installed into and removed from the apparatus body through the opening in the width direction of the recording medium, the transfer unit to contact the image bearer unit to form a transfer nip between the image bearer unit and the transfer unit, the transfer nip through which the recording medium is conveyed; and a unit holder to hold the image bearer unit and the transfer unit, the unit holder including:

a first positioner disposed opposite one lateral end of the image bearer unit and the transfer unit in the width direction of the recording medium, the one lateral end disposed opposite the opening, the first positioner detachably attached to the image bearer unit and the transfer unit, and a second positioner disposed opposite another lateral end of the image bearer unit and the transfer unit in the width direction of the recording medium, the second positioner to hold the image bearer unit and the transfer unit in a state in which the image bearer unit and the transfer unit are detachably attached to the second positioner in the width direction of the recording medium, the first positioner and the second positioner to secure a relative position of the image bearer unit relative to the transfer unit in a direction parallel to a hypothetical orthogonal plane perpendicular to the width direction of the recording medium.

3. The image forming apparatus according to claim 2, wherein, in a state in which the unit holder holds one of the transfer unit and the image bearer unit, another one of the transfer unit and the image bearer unit is to be removed from the apparatus body.

4. The image forming apparatus according to claim 3, wherein the second positioner of the unit holder holds the one of the transfer unit and the image bearer unit.

5. The image forming apparatus according to claim 2, wherein the image bearer unit includes an image bearer to bear an image, and wherein the transfer unit includes a transferor to contact the image bearer to form the transfer nip between the image bearer and the transferor.

6. The image forming apparatus according to claim 5, further comprising:

a contact member to contact the image bearer; and a third positioner mounted on the apparatus body and disposed opposite said another lateral end of the image bearer unit and the transfer unit in the width direction of the recording medium, the third positioner to secure a relative position of the image bearer relative to the contact member in the direction parallel to the hypothetical orthogonal plane perpendicular to the width direction of the recording medium.

7. The image forming apparatus according to claim 6, wherein the third positioner supports the second positioner in a state in which the second positioner is displaced along the hypothetical orthogonal plane perpendicular to the width direction of the recording medium.

8. The image forming apparatus according to claim 6, wherein the contact member bears the image, and wherein the image bearer includes an intermediate transferor onto which the image on the contact member is transferred intermediately.

9. The image forming apparatus according to claim 8, wherein the intermediate transferor includes an endless belt including:

a surface layer to bear the image;

an elastic layer disposed on the surface layer; and an inelastic layer disposed on the elastic layer.

10. The image forming apparatus according to claim 2, wherein the unit holder further includes:

a first engaging portion penetrating through the first positioner;

a second engaging portion penetrating through the first positioner;

a third engaging portion penetrating through the second positioner; and a fourth engaging portion penetrating through the second positioner, wherein the image bearer unit includes:

a first engaged portion to engage the first engaging portion; and a second engaged portion to engage the third engaging portion, and wherein the transfer unit includes:

a third engaged portion to engage the second engaging portion; and a fourth engaged portion to engage the fourth engaging portion.

11. The image forming apparatus according to claim 10, wherein at least one of the first positioner and the second positioner includes:

a positioner body; and a bearing attached to at least one of the first engaging portion, the second engaging portion, the third engaging portion, and the fourth engaging portion, and wherein the bearing is made of a low friction material having a coefficient of friction that is smaller than a coefficient of friction of the positioner body.

12. The image forming apparatus according to claim 10, wherein at least one of the first positioner and the second positioner defines an identical flat plate.

13. The image forming apparatus according to claim 10, wherein each of the first engaging portion, the second engaging portion, the third engaging portion, and the fourth engaging portion includes a hole.

14. The image forming apparatus according to claim 10, wherein each of the first engaged portion, the second engaged portion, the third engaged portion, and the fourth engaged portion includes a pin.

* * * * *